United States Patent [19]

Deyesso et al.

[11] 4,436,251
[45] Mar. 13, 1984

[54] TAPE WINDING SYSTEM

[75] Inventors: Joseph P. Deyesso, Walpole, Mass.; David Sarser, Northport, N.Y.; Richard G. Berube, Marlboro, Mass.

[73] Assignee: King Instrument Corporation, Westboro, Mass.

[21] Appl. No.: 290,417

[22] Filed: Aug. 6, 1981

[51] Int. Cl.³ .................. B65H 59/38; B65H 77/00; H02P 5/46
[52] U.S. Cl. ............................ 242/56 R; 242/75.51; 318/7
[58] Field of Search .............. 242/56 R, 75.4, 75.43, 242/75.3, 75.51, 182, 183, 184, 187, 58.1, 58.4; 156/502, 504, 505; 318/6, 7

[56] References Cited

U.S. PATENT DOCUMENTS

| | | | |
|---|---|---|---|
| 3,814,343 | 6/1979 | Bennett | 242/56 R |
| 3,910,521 | 10/1975 | O'Callaghan | 242/75.51 |
| 4,157,488 | 1/1979 | Allan | 242/75.51 |
| 4,341,362 | 9/1982 | Neathery | 242/56 R |
| 4,347,993 | 9/1982 | Leonard | 242/75.51 |

Primary Examiner—Stuart S. Levy
Assistant Examiner—Lloyd D. Doigan
Attorney, Agent, or Firm—Schiller & Pandiscio

[57] ABSTRACT

Apparatus for winding a preselected, programmable amount of tape under a predetermined level of tension is described. The tape is automatically placed under the predetermined level of tension prior to actually winding the tape onto the hub. The tape is fed at a variable speed according to a look-up table, while it is wound onto a hub, and is servoloop controlled so as to maintain constant tension on the tape as the speed at which the tape is fed changes.

14 Claims, 7 Drawing Figures

TAPE WINDING SYSTEM

The present invention relates generally to systems for winding tape onto a hub, and more particularly to apparatus for controlling the tension on tape while winding a preselected amount of the tape onto a hub.

Systems are well known for transferring magnetic recording tape of the type used in video or audio applications from large supply reels to smaller hubs commonly employed in tape cassettes and cartrides. See, for example, U.S. Pat. Nos. 3,499,614, 3,637,153, 3,752,415, 3,776,488, 3,893,167, 3,997,123, 3,917,184, 4,061,286, 4,101,938 and 4,204,898. A typical transfer procedure comprises starting with first and second hubs connected by a leader tape, serving the leader tape into two portions with one portion being connected to a corresponding hub. The magnetic tape is then spliced to the end of the leader portion of one hub. A preselected amount of magnetic tape is then wound onto the one hub. The magnetic tape is then severed and the trailing end of the wound magnetic tape is spliced to the other leader portion of the other hub. The entire procedure can be accomplished on two hubs prior to mounting the two hubs and tape into a cassette housing. Alternatively, the entire method can be carried out with the hubs previously mounted in a cassette housing.

During the winding procedure it is obvious that winding at a constant speed, i.e., driving the hub at a constant radial speed, results in a variation in the linear speed of and tension on the tape as the position of the tape being wond onto the hub varies from the hub center axis. This is often undesirable, particularly for some tapes such as those used for video recordings.

Accordingly, many manufacturers of tape winding machines employ various techniques of maintaining a constant tension on the magnetic recording tape when winding the tape onto the hub. One such technique employs vacuum columns to control the tension of tape during the winding operation. See, for example, U.S. Pat. Nos. 3,499,614, 3,752,415, 3,776,488 and 3,893,167. The variable force vacuum column is a vacuum column in which the force on the tape loop varies with the position of the loop in the column. Examples are tapered vacuum columns, parallel wall vacuum columns with slots or openings at various positions through the wall of the column connected to atmosphere or a vacuum source, or a combination of these examples.

Another technique for controlling the tension on a moving tape is shown in U.S. Pat. No. 4,101,938, wherein a slide potentiometer, controlled by the position of a pivotally supported lever arm, produces a voltage output indicative of the position of the arm and the tension of a moving tape. The voltage output is applied to a motor controller. The latter in turn controls the speed of a drive motor used for feeding the tape toward the lever arm so as to maintain the tension on the tape "constant" at the point where the tension detecting arm contacts the tape. While this system attempts to maintain the tape under constant tension no effect is made to control the speed at which the tape is wound onto a hub.

In addition, in some prior art tape winding systems there can often be a great difference in the actual amount of tape would onto a hub when attempting to wind the predetermined amount of tape on each of a plurality of hubs on a mass production basis.

It is, therefore, a general object of the present invention to overcome the disadvantages of the prior art systems.

Another object of the present invention is to provide an improved system for automatically winding a preselected amount of tape onto a hub while accurately maintaining the tape under constant tension.

An another object of the present invention is to provide an improved system for repeatedly winding a preselected, programmable amount of tape onto a hub which amount can easily be selected by the operator of the system.

Still another object of the present invention is to provide an improved system for placing tape under a desirable tension level prior to winding the tape onto a hub, and winding the tape onto the hub substantially at that tension level.

Yet another object of the present invention is to provide a tape winding system in which a tape is fed in accordance with a predetermined nonlinear function, and the tape is wound onto a hub such that the tension on the tape remains substantially constant.

These and other objects are achieved by an improved apparatus for winding tape onto a hub. The tape is fed at a variable speed according to a look-up table, while the tape is wound onto a hub at a speed which is servo-controlled to maintained constant tension as the speed at which the tape is fed changes. Preferably, the tape is automatically placed under the predetermined level of tension prior to actually winding the tape onto the hub.

Other objects of the invention will in part be obvious and will in part appear hereinafter. The invention accordingly comprises the apparatus possessing the construction, combination of the elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein.

In the drawings, the same numerals are used to designate similar or like parts.

Figure 1:
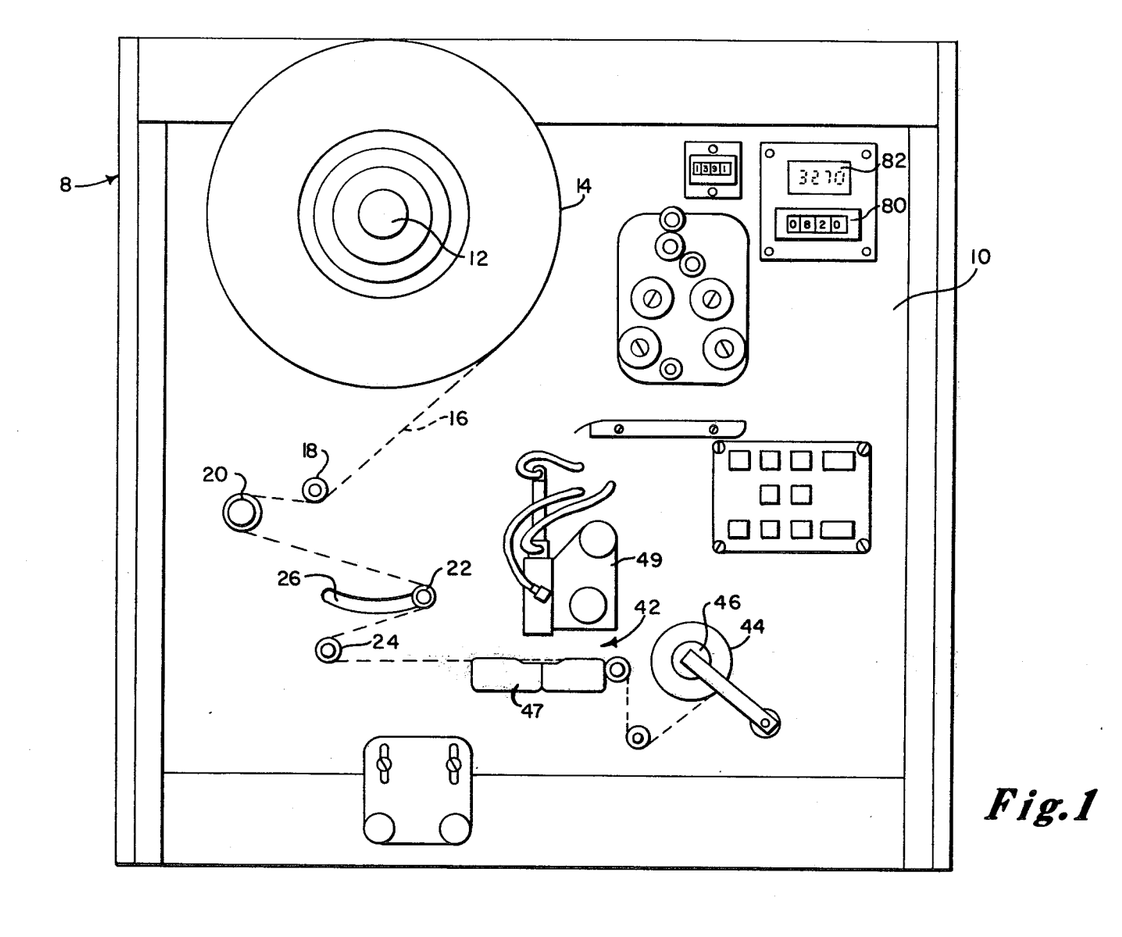
FIG. 1 illustrates the preferred embodiment of the tape winding system, also adapted to cut and splice the tape prior to and after winding tape onto a hub.
Figure 2:
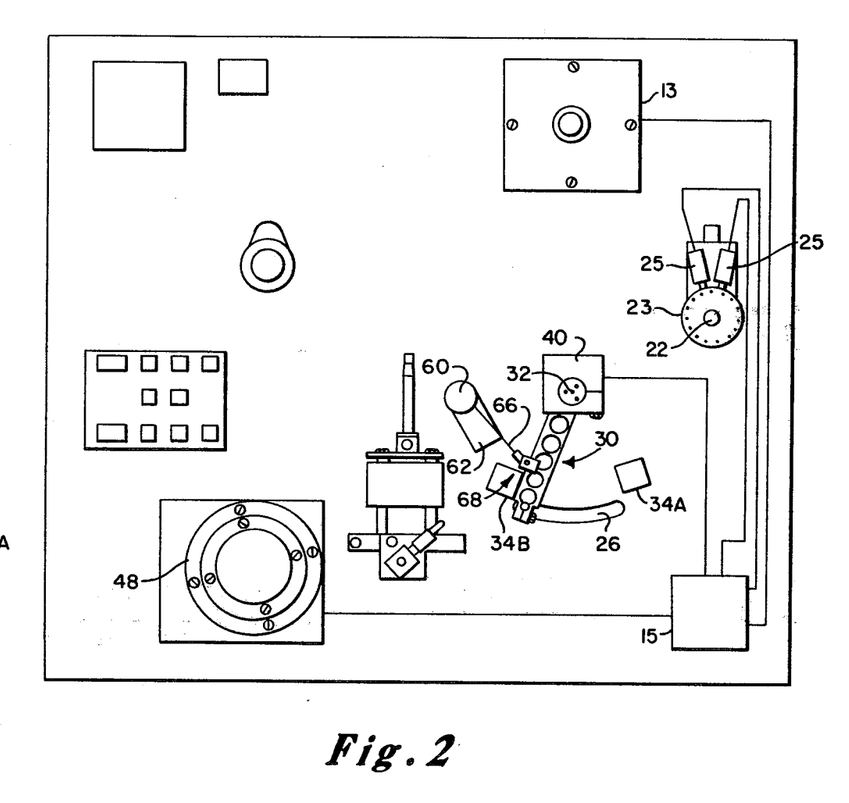
FIG. 2 shows a view of the rear of the front panel of the FIG. 1 system.
Figure 3:
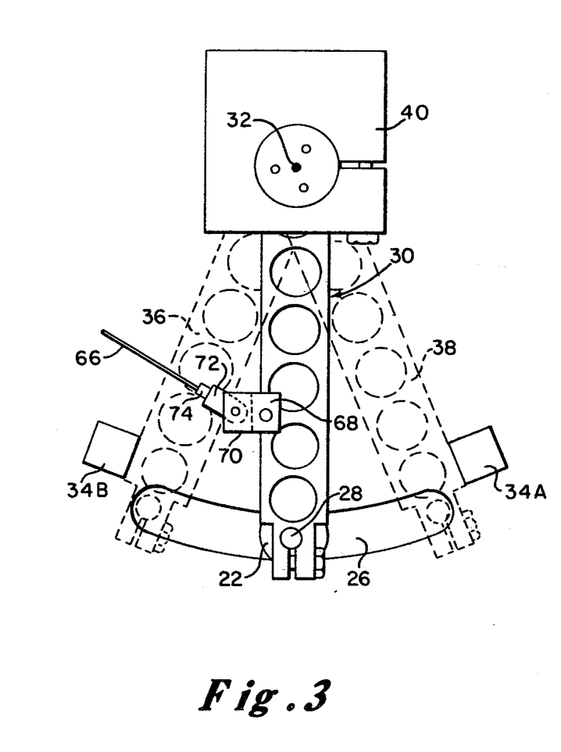
FIG. 3 shows a rear view of the dancer arm between the two limit positions.

A tape loading system 8 is shown in FIG. 1. System 8 is of a type which generally includes tape cutting and splicing mechanisms which are well known in the art and incorporates the tape winding apparatus of the present invention. Specifically, the system 8 includes a front panel 10 supporting a drive spindle 12. The latter, in turn, is rotatably driven by a tape drive motor 13 (shown in FIGS. 2 and 4) which in turn is driven by the control system 15 (shown generally in FIG. 2 and in detail in FIG. 4). The spindle 12 rotatably supports a supply reel 14 of tape 16. Tape 16 is fed under roller 18, over metering wheel 20 (wheel 20 being described in greater detail in connection with FIG. 4) and around the roller 22 to the roller 24. Wheel 20 drives the encoder 23 (shown in FIG. 2) which includes photocells 25. The latter are adapted to provide a predetermined number of pulses for each revolution of wheel 20 and therefore provide an electrical signal representative of the actual amount of tape traveling over wheel 20 and more particularly wound onto the hub as will be more evident hereinafter. Roller 22 is disposed in an arcuate slot 26 and, as shown in FIG. 3, is rotatably secured to an axle 28 provided on pivotal arm 30. Arm 30 is mounted to the rear of panel 10 so that it is pivotal about pivot axis 32 at a location spaced from axle 28 such that roller 22 freely moves in arcuate slot 26 as the arm 30 pivots about axis 32. As best shown in FIG. 3, switches 34A and 34B, preferably in the form of magnetic switches, can be provided on the rear of panel 10 to (1) limit the pivotal position of arm 30 to positions between the two extreme positions 36 and 38 shown, wherein roller 22 is respectively near the opposite ends of arcuate slot 26 and (2) sense when the arm 30 is in one of the two extreme positions. In this regard the positions of wheel 20 and roller 24 is such that a line drawn between the rotation axes of these two rollers will be to one side of the rotation axis of roller 22 at all times, regardless of the position of the arm 30. The tape 16, therefore, can only pull roller 22, and thus arm 30, toward position 38. The arm 30 is suitably attached to the tap of the potentiometer 40 so that by providing a suitable potential across the potentiometer, the voltage output of the potentiometer varies as a function of, and thus provides an indication of, the pivotal position of arm 30.

Referring again to FIG. 1 the tape is fed from roller 24 through the tape cutting and splicing station 42 to the take up hub 44 mounted on a take up spindle 46. Cutting and splicing station 42 is well known and may, for example, be the type shown in U.S. Pat. No. 4,061,286. Station 42 generally includes a splicing block assembly 47 for holding the leader tape provided on hub 24. A tape splicer assembly 49 cuts the leader tape, splices the leading edge of tape 16 to one piece of leader tape before the tape is wound onto hub 44, cuts the tape 16 after tape 16 is wound onto hub 44 and splices the trailing edge of tape to the remaining portion of the leader tape positioned on block assembly 47. As shown in FIG. 2, spindler 46 is driven by a take up motor 48 so that the tape is wound onto hub 44. The linear speed at which the tape 16 is wound onto the hub 44 is varied as the radial location of the tape on hub 44 increases, so that the tension on the tape remains substantially constant. This is accomplished by connecting the take up motor 48 to the output of a servo system contained within control system 15, which in turn receives an output from potentiometer 40.

Thus, as tape 16 is wound onto hub 44, the arm 30 tends to move towards position 38 (the roller 22 moves to the left in FIG. 1) as the tension on the tape 16 increases, while arm 30 moves toward position 36 (the roller 22 moves to the right in FIG. 1) as the tension on tape 16 decreases. The movement is sensed by potentiometer 40, which in turn provides the appropriate output to a servo system of control system 15. The latter provides an output to drive motor 48 so as to regulate the speed at which the tape 16 is wound onto the hub 44. The first movement of arm 30 is actually caused by tension of the tape 16 above the desired level, producing a force on the arm 30 so that roller 22 is moved to the left in FIG. 1 or the right in FIG. 2. At the desired level of tape tension the arm 30 remains in a neutral position and does not move. Finally, when the tension on tape 16 decreases below the desired level, less force is applied to the arm 30 and the roller 22 moves to the right in FIG. 1 and to the left in FIG. 2. A biasing force in the direction of arm position 36 is utilized to negate the force produced by the running tape so as to maintain the arm between the two positions as the tape is being wound and to move the arm 30 toward position 36 when the tension on the arm falls below the desired level. The means for providing this negating force can be any suitable means, such as a simple negator spring connected to bias the arm 30 toward the position 26. Alternatively, and preferably as described in copending application U.S. Ser. No. 266,287 filed by David Sarser and Richard A. Berube on May 22, 1981, (assigned to the present assignee) the torque output of a DC motor 60 can be suitably coupled to the arm 30 for providing the desired bias towards the position 36. More particularly, as shown in FIGS. 2 and 3, the motor 60 is mounted on the rear of panel 10 by any suitable means such as bracket 62. The motor is positioned on the side of arm 30 which is opposite to the position of rollers 20 and 24 on the front of panel 10. The motor 60 can be any DC torque motor providing the desired level of torque output on its output shaft. The torque output of motor 60 is coupled to arm 30 through line 66. The latter has one end secured to the output shaft of the motor so that the shaft actually pulls line 66. The line 66 is secured at its other end to arm 30 by any suitable means such as bracket assembly 68. Bracket assembly 68 includes a yoke 70 and a cylinder 72 rotatably secured within yoke 70. The line 66 is secured to cylinder 72 by any suitable means such as the set screw 74 attached to cylinder 72.

As will be more evident hereinafter, as shown in FIG. 1, means in the form of footage selection switches 80 are provided in the front panel 10 so that a preselected amount of tape 16 to be wound onto hub 44 can be programmed by the user. Switches are preferably BCD switches which are well known in the art for providing electrical signals in binary form indicative of the digital numbers visually selected by the operator. Further, a visual display of the actual number of feet of tape determined by encoder 23 to have been wound onto hub 44 is provided on display 82.

Figure 4:
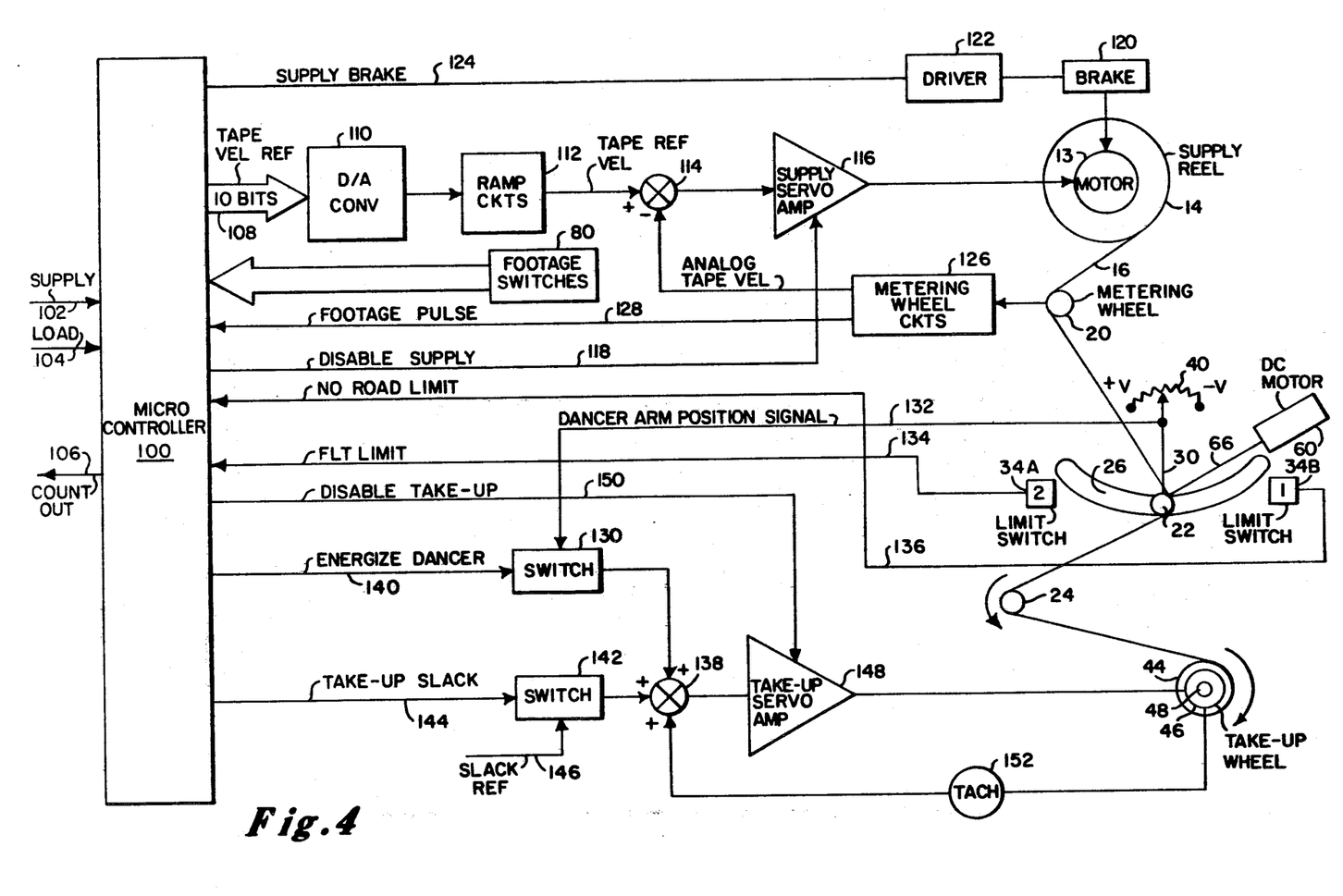
FIG. 4 shows a partial block and partial schematic diagram of the preferred embodiment of the tape-winding system of the present invention.

Referring to the partial schematic and partial block diagram of the FIG. 4 the system for winding tape from reel 14 onto hub 44 is shown in detail. The system for winding tape includes the micro-controller 100 having supply and load inputs 102 and 104, respectively and a count output 106, as well known in the art. Controller 100 can be any commercially available microprocessing unit, such as the 8085 Microprocessor manufactured by Intel Corporation of California, although it will be evident that other microprocessors can be used. Controller 100 is preferrably programmed in accordance with the program attached hereto as Appendix A. For ease of exposition the program of Appendix A is represented by the flow charts shown in FIGS. 5A, 5B, and 5C. Controller 100 includes a binary output, shown over line 108, which is transmitted to the input of a digital to analog converter 110. Preferably, the output is a ten bit output representative of a speed at which motor 13 is to be driven. Digital to analog converter 110 is a type well known in the art for converting the ten bit output on line 108 to an analog signal whose amplitude level is a function of the ten bit input. Since the ten bit input to converter 110 provides 1024 different inputs, the output of converter 110 can be at any one of 1024 incremental amplitude levels. The analog incremental output of converter 110 is connected to ramp circuit 112. The latter is of a type well known in the art for smoothing out the incremental analog output of converter 110, and for generating a ramp voltage at a rate which is a function to the input from the converter 110. The output of circuit 112 is connected to the positive input of a summing junction 114, which in turn has its output connected to the supply servo amplifier 116. So long as amplifier 116 is enabled, the output of junction 116 is processed and thence supplied directly to drive motor 13 for rotating supply reel 14. Amplifier 116 is connected to receive a disabling supply signal from controller 100 over line 118 so as to disable the amplifier and prevent an output signal from amplifier 116 to motor 13. As will be more evident hereinafter, at the completion of the winding of tape onto hub 44, motor 13 is stopped by brake 120 when driven by the driver 122, which in turn receives a supply brake enable signal over line 124 from the controller 100. As previously described switches 80 are provided for programming the select amount of footage which is desired to be wound on hub 44 from the reel 14. Means, preferably in the form of metering wheel 20, is provided for measuring the amount of tape actually provided by supply reel 14 and wound onto hub 44. Metering wheel 20 is rotatably driven by the tape 16 as the tape 16 moves over the wheels. As shown in FIG. 2, shaft encoder 23 including photocells 25 operates to provide a pulse train output representative of the revolutions of the wheel as the wheel rotates. In a typical design the output of the encoder 23 provides 256 pulses per foot of tape although it is evident that this number can vary. The outputs of the photocells 25 of the encoder are provided to the metering wheel circuits 126 as shown in FIG. 4. Circuits 126 reduce the number of pulses provided by the photocells 25 to an acceptable level for controller 100. For example, one pulse per tape foot can easily be provided by dividing the 256 pulse per foot output by a divide by 128 circuit (not shown) and thence by a divide by 2 circuit (not shown) as well known in the art. By providing a large number of pulses per foot output from the encoder, good resolution with respect to measuring the amount of tape actually passing over wheel 20 is achieved, while circuits 126 reduce the count to an acceptable level for controller 100. This digital output representative of the footage length of tape passing over wheel 20 is transmitted from circuits 126 to controller 100 over line 128. Circuits 126 also includes a tachometer (not shown) for measuring the actual velocity of the tape over wheel 20. The output of the tachometer of circuits 126, the analog tape velocity signal, will vary proportionally with the tape reference velocity output of ramp circuits 112. The analog tape velocity output of circuits 126 is transmitted to a negative input to the summing junction 114 where it is subtracted from the ramp output of circuits 112.

The servosystem for controlling the take up of tape onto the hub 44 includes the potentiometer 40. Potentiometer 40 has its output connected over line 132 to an input of switch 130. Limit switches 34A and 34B are suitably connected over lines 134 and 136, respectively, to controller 100. Potentiometer 40 is suitably bias by a voltage potential such that the output (the dancer arm position signal) over line 132 to switch 130 will be zero volts when the arm 30 is in an intermediate, neutral position such as shown in FIG. 4. The output will become (1) increasingly positive as the arm 30 moves from its neutral position toward switch 34B when the tension on tape 16 increases, and (2) increasingly negative as the arm 30 moves toward the limit switch 34A when the tension decreases. Arm 30 closes switch 34A when in position 38 generating a signal over line 134 to controller 100 indicating that arm 30 is in position 38. Similarly, when arm 30 is in extreme position 36, switch 34B closes providing a signal over line 136 to controller 100 indicating that arm 30 is in the position 36.

Switch 130 remains open when no signal is provided by controller 100 over line 140. When a signal is provided over line 140, switch 130 closes providing the dancer arm position signal to the positive input of summing junction 138. A second switch 142 provides a slack reference input signal present at 146 to a positive input of summing junction 138 when enabled by the take up slack signal provided from controller 100 over line 144. The output of summing junction 138 is transmitted to the input of the take up servo amplifier 148, which in turn provides an output to and drives the take up drive motor 48 so long as amplifier 148 is enabled. Amplifier 148 remains enabled unless a disable signal is provided by controller 100 over line 150. A tachometer 152 measures and provides an output signal indicative the speed of take up drive motor 48. The output signal of tachometer 150 is provided to a third positive input of summing junction 138.

In operation, the slack reference signal has been preset for an optimum low speed winding of the slack tape onto the hub 44. The user selects the desired footage of tape to be wound onto hub 44 by setting the footage switches 80. For example, a video cartridge typically is provided with 800 feet of tape.

As well known in the art, the tape 16 has been prewound around roller 18, wheel 20, roller 22, wheel 24 and secured in block asembly 47. The tape leader provided on hub 44 will also be secured to block assembly 47. The cutting and splicing mechanism 49 operates in a manner well known in the art by cutting the leader tape and splicing the leading edge of the tape 16 positioned on block assembly 47 to the leader tape portion connected to hub 44. The tape 16 can now be wound onto hub 44.

An initiation signal (step 200 in FIG. 5A) is now provided at the load input 104, which can be accomplished manually by closing an external switch (not shown) or automatically by providing such a signal responsively to the completion of the splicing operation between the leader tape portion connected to hub 44 and the tape 16. The winding operation proceeds in accordance with the flow chart in FIGS. 5A, 5B, and 5C. With little or no tension on tape 16 prior to initiation of the winding operation the negating force providing by the torque output of motor 60 through line 66 will pull arm 30 toward limit position 36. Arm 30 should be in limit position 36 (step 202 of FIG. 5A) so that a signal is provided over line 136 to controller 100. If a signal is provided over line 136, the system will initially provide a signal over line 124 to driver 122. Driver 122 in turn will provide an output to brake 120. Reel 14 will therefore be prevented from rotating. (Step 204 in FIG. 5A). An energization signal is then provided over line 144 to close switch 142. The slack reference signal at 146 is then applied through junction 138 to servo amplifier 148 (step 206 of FIG. 5A). The disable signal over line 150 is then removed (step 208 of FIG. 5A) so that the slack reference signal is applied to motor 48. The motor 48 pulls tape 16 moving arm 30 against the torque output of motor 60 into the neutral position since the slack reference signal is at a predetermined level as a function of the desired level of tension for the tape 16 and the reel 14 is prevented from rotating. Since the limit switch 34B is now open, the servocode of FIG. 5A progresses to step 210.

Figure 5A:
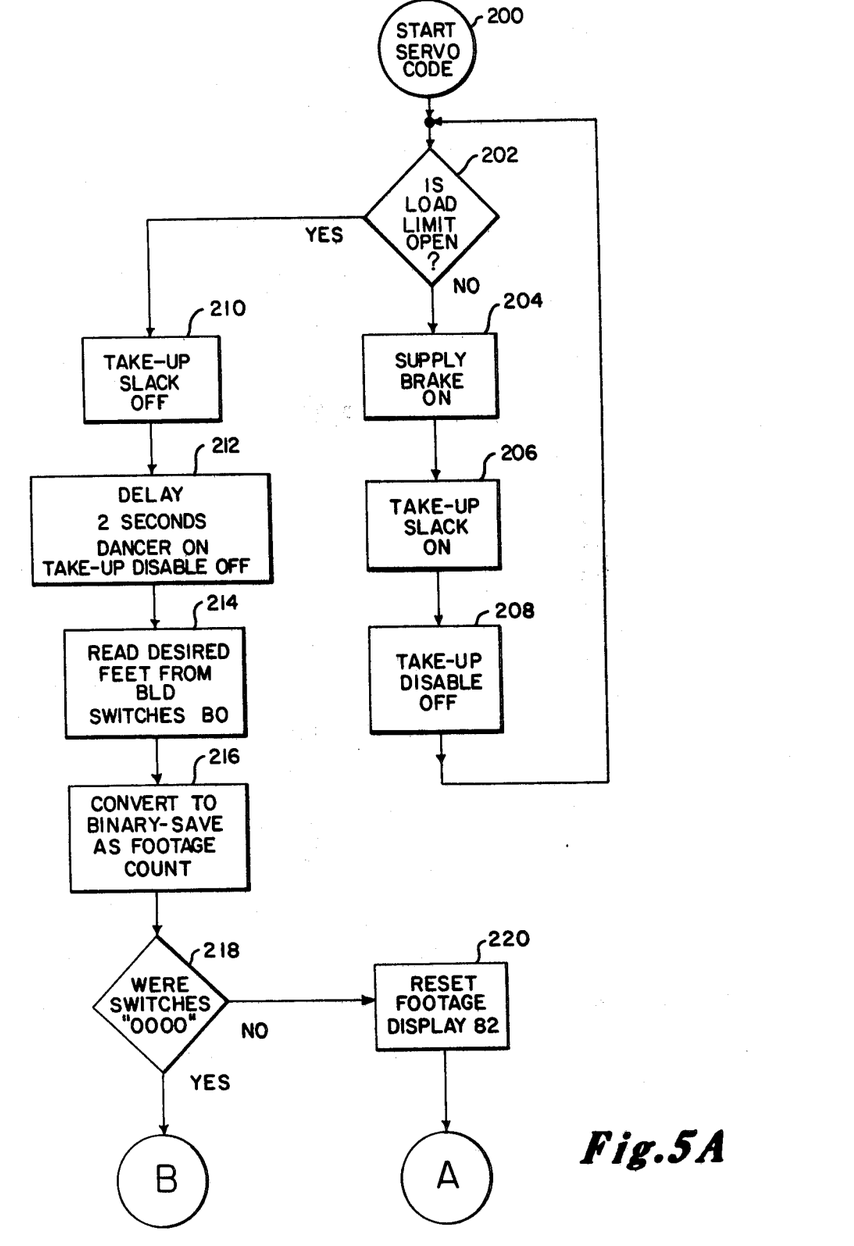
FIGS. 5A, 5B and 5C show a flow chart of the operation of the FIG. 4 embodiment.

Next the energize signal over the take-up slack line 144 is removed so as to disable switch 142 (step 210 of FIG. 5A). In step 212 of FIG. 5A, a delay of two seconds occurs and the energize signal over line 140 is provided to close switch 130 and provide the dancer arm position signal to the summing junction 138 and thence to the input of amplifier 148. Since the dancer arm 30 is substantially in the neutral position the position signal will be zero. The disable take-up signal over line 150 is removed so that amplifier 148 provides an output signal to take up motor 48.

Almost simultaneously, controller 100 next reads the desired footage count provided in binary code from switches 80 (step 214 of FIG. 5A). This desired footage count is stored in control 100 (step 216 in FIG. 5A). If the footage count is set at zero the operation would jump to step 242 shown in FIG. 5C and described hereinafter. However, so long as this footage count is not zero (step 218), the program will continue to step 220. Next, in accordance with step 220, the footage pulse output from the metering wheel circuits 126 is received controller 100 so as to read the actual footage of tape which has been wound onto hub 44. This actual footage is shown on display 82.

The operation proceeds to step 222 (shown in FIG. 5B) where the actual footage count from circuits 126 is substrated from the desired footage count provided by switches 80.

Figure 5B:
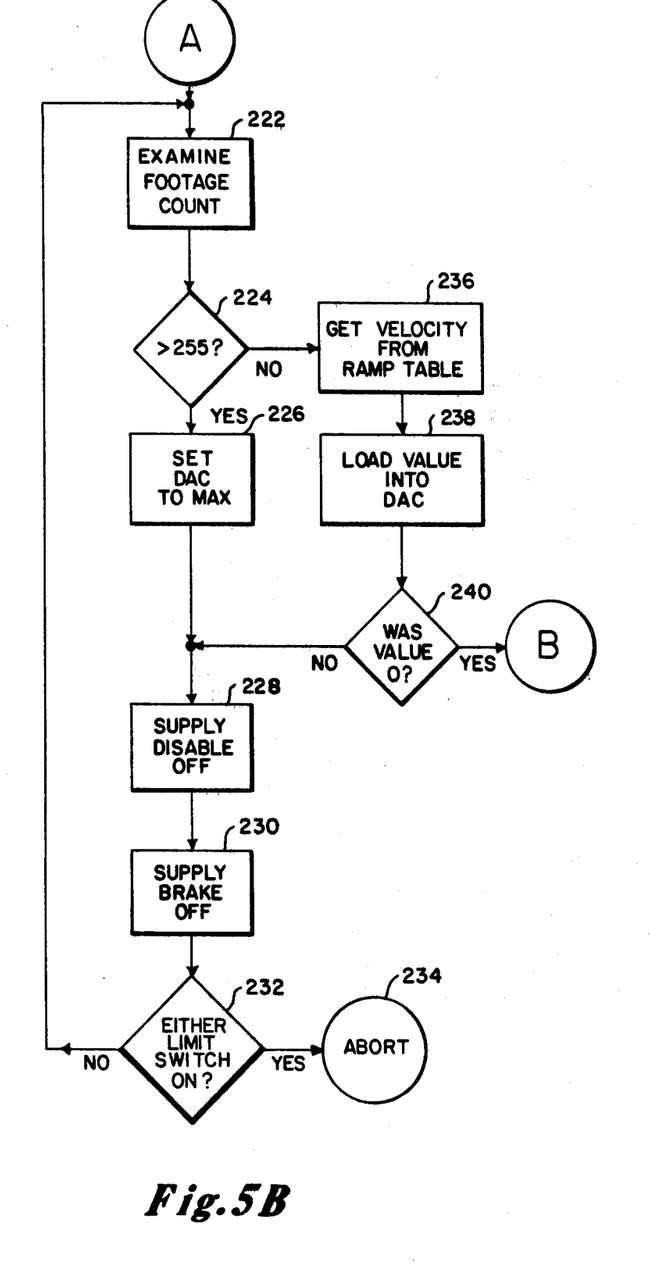
Figure 5C:
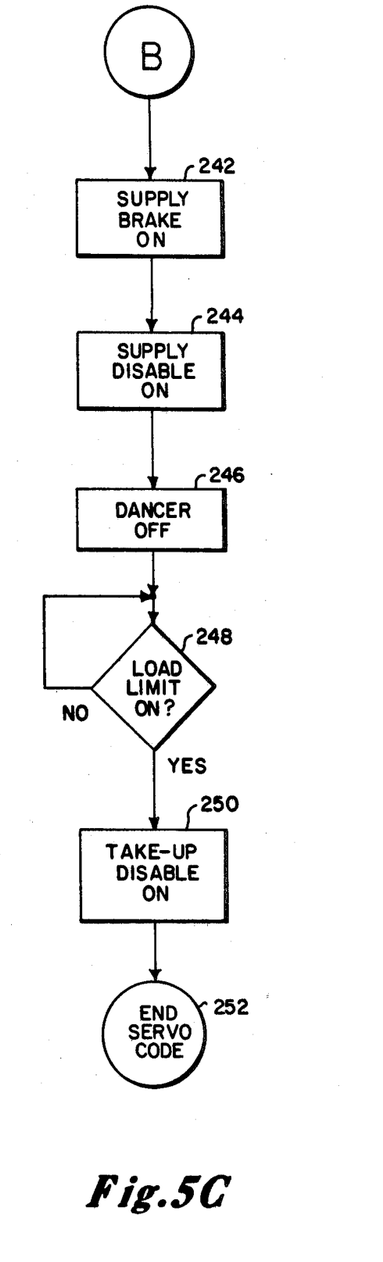

Since the ramp look up table provided in the program of Appendix A varies from 0 to 255 feet remaining, the system next determines whether the remaining number of feet of tape 16 to be wound onto hub 44 exceeds 255 as shown at step 224. If yes then the program proceeds to step 226, wherein the controller provides the maximum 10 bit binary output over line 108 to converter 110. Converter 110 will thus provide the maximum output to ramp circuit 212 so that the latter provides a ramping voltage output which increases at a maximum rate. The analog tape velocity output of the tachometer of metering wheel circuits 126 is subtracted from the tape reference velocity output of circuits 112 at junction 114, with the difference signal being subsequently applied to the input of servo amplifier 116. At step 228 amplifier 116 is enabled by insuring that the disabling signal is not provided over line 118, i.e., the line 118 is off, and similarly at step 230 the motor 13 is enabled by insuring that line 124 is off and brake 120 removed. The system next checks to make sure that neither switch 34A or 34B is closed. If one of the switches 34A or 34B is closed, indicating that arm 30 is in one of its two limit positions, the system aborts as shown at step 234, shutting down the operation and indicating to the operator that something is wrong.

Should both switches 34A and 34B remain open the system continues to operate by returning to step 222 of FIG. 5B. The system continues in the loop defined by steps 222, 224, 226, 228, 230 and 232 until the remaining number of feet of tape 16 to be wound onto hub 44 equals 255. It should be appreciated that until the remaining number of feet of tape equals 255, the ramp circuits 112 will continue to ramp at its maximum rate upwardly. However, as the speed of the motor 13 increases, so does the analog tape velocity signal output of the tachometer output of the metering wheel circuits 126. The latter signal is applied to the negative input of summing junction 114. This analog tape velocity signal at the output of circuits 126 is the inverse of the ramp output of the ramp circuits 112 so that the output of the summing junction 114 levels off at some constant D.C. value when motor 13 has achieved its desired speed.

When the number of feet of tape to be wound onto hub 44 falls to 255, the system will proceed from step 224 to step 236. At step 236 the the ramp look up table shown in the program of Appendix A determines the velocity for this approximate incremental value of feet. The value is represented by a 10 bit output at 108 which is transmitted to the converter 110 according to step 238. So long as the value is not zero, the system proceeds through steps 228, 230, 232, 222 and back to step 224. Since the feet remaining is progressing toward zero, the value of remaining feet to be wound onto hub 44 will now be less than 255. The system operation will proceed to step 236, determine the appropriate ten bit output value for the currently determined incremental value of the remaining number of feet left to be wound onto hub 44, provide the output to converter 110 in step 238 and proceed to step 240. The system continues in the loop defined by steps 240, 228, 230, 232, 222, 224, 236, 238 and back to 240 so long as there is still an incremental amount of tape still to be wound onto hub 44. During operation in this loop the analog voltage output of converter 110 is proportional to the binary output on line 108 and will vary in a nonlinear manner with respect to the decrease in the incremental amount of tape remaining to be wound onto hub 44.

The system operation will continue in this loop until the value of input to converter 110 equals zero. When this occurs the system will proceed from step 240 to step 242 (see FIG. 5C), whereupon a signal is provided by controller 100 over line 124 to the driver 122 which in turn applies brake 120 to motor 13. Almost simultaneously, in accordance with successive steps 244 and 246, a disable signal is applied over line 118 disabling servo amplifier 116, and the energize signal provided on line 140 is withdrawn, opening switch 130. Since the take up motor is still running the output of tachometer 148 will provide an output and the take up motor 48 continues to pull tape sufficiently to move dancer arm 30 to limit position 38. As shown at step 248 when limit switch 34A closes indicating that arm 30 is in the limit position 38, the operation proceeds to step 250 to provide a disable signal over line 150 to amplifier 148, so that no signal is now applied to motor 48.

It should be appreciated that during the entire winding procedure, the dancer arm 30 assures that tape 16 is wound onto the hub under constant tension even though the tape 16 is fed at varying speeds by motor 13. This results because of several reasons. First, the proper tension of the tape is set before the winding begins as provided by the steps 202, 204, 206 and 208 of the operation. This places the arm 30 in its neutral position wherein the output of potentiometer 40 is zero. When winding begins and during the entire winding operation should the tension on the tape start to increase above the desired level, the arm 30 will pivot toward switch 34A and the output of potentiometer 40 will go negative. This decreases the output of summing junction 148, decreasing the input to motor 48. The speed of motor 48 will decrease resulting in a decrease in the tension of the tape. The arm will be pulled by the torque output of the DC motor 60 back toward the arm's neutral position. This, in turn, results in a decrease in the negative output of the potentiometer until it is back to zero. In a similar but opposite manner should the tension on the tape decrease below the desired level during the winding operation, the arm 30 will be pulled by motor 60 through line 66 toward switch 34B. This results in a positive output of potentiometer 40. The positive output is fed through closed switch 130, through junction 138 and amplified by the enabled amplifier 148 to increase the speed of the motor 48. This speeds up motor 48 to increase the tension on tape 16. This in turn forces arm 30 back to its neutral position reducing the output of potentiometer 40 back to zero.

Further, the nonlinear rate at which motor 13 will increase its speed from its start up to a point where a constant speed is achieved (assuming a sufficient amount of tape 16 is wound onto hub 44 to allow motor 13 to achieved constant speed) will be equal and opposite to the nonlinear rate at which motor 13 will decrease when slowing down and stopping. If insufficient tape is to be wound onto hub 44 to enable the motor 13 to achieve constant speed it will be appreciated that the nonlinear rate of increasing speed will still match the nonlinear rate of decreasing speed.

It will be appreciated that providing tachometer 152 improves the stability of the servo loop provided by dancer arm 30 by preventing the arm from oscillating as a result of what is often referred to as "control jitter".

Once the winding operation is completed the tape 16 positioned on block assembly 47 can be cut by assembly 49 and the trailing edge of tape 16 spliced to the remaining leader portion provided on another hub. This cutting and splicing operation can be accomplished by manually initiating the operation or can be accomplished automatically in response to the completion of the winding operation.

While the invention has been described in its preferred form it will be evident to those skilled in the art that modifications can be made to the system described in the drawing without departing from the scope of the invention. For example, the look up table provided in Appendix A may vary depending upon the type of tape being used, the performance of motor 13, etc. Similarly, the desired level of tension on tape 16 can be set by adjusting the slack reference signal at input 146 and the torque output of motor 60 so that during step 206 of FIG. 5A, this desired tension level will be provided when the arm 30 is moved into its neutral position and the output of potentiometer 40 is zero. Additionally, while a two second delay is imposed at step 212 to insure that the slack of tape 16 has been taken up, the same result can be achieved by, for example, sensing the output of potentiometer 40 so that when it equals zero, indicating the arm 30 is in the neutral position the winding operation can begin. The operation can then continue in the manner previously described.

Since certain other changes may be made in the above apparatus without departing from the scope of the invention herein involved, it is intended that all matter contained in the above description or shown in the accompanying drawing shall be interpreted in an illustrative and not in a limiting sense.

What is claimed is:

1. Apparatus for winding tape onto a hub, said apparatus comprising, in combination:

first drive means for feeding from a supply of said tape a preselected, programmable amount of said tape at a speed which is variable in accordance with a predetermined function; said first drive means comprising tape measuring means for measuring the length of tape fed by said first drive means and means for comparing said length of said tape with said preselected amount;

second drive means for driving said hub so as to wind tape fed by said first drive means onto said hub; and tension monitoring means for maintaining at a predetermined level substantially constant tension on said tape as said tape is fed by said first drive means and wound onto said hub said second drive means, said tension monitoring means including (1) a pivotally mounted dancer arm for supporting the tape as said tape is fed by said first drive means and wound onto said hub by said second drive means, said dancer arm being mounted so that its pivotal position varies with the tension on said tape, and (2) means for adjusting said second drive means responsively to changes in the position of said dancer arm so as to vary the speed at which said tape is wound onto said hub in a direction and by an amount which will maintain the tape wound onto said hub at a substantially constant tension; and means responsive to said comparison between the length of tape measured by said tape measuring means and said preselected amount for disabling said first and second drive means when said length of tape measured by said tape measuring means equals said preselected amount.

2. Apparatus according to claim 1, further including means for establishing said predetermined level of constant tension on said tape prior to feeding said tape from said supply.

3. Apparatus according to claim 2, wherein said means for establishing said predetermined level of constant tension includes means for holding said tape at said first drive means and means for sufficiently driving said second drive means with an electrical signal at a predetermined amplitude so that said hub pulls on said tape maintaining said predetermined level of constant tension.

4. Apparatus according to claim 3, wherein said dancer arm is movable between a first limit position wherein the tension on said tape exceeds said predetermined level and a second limit position wherein the tension on said tape falls below said predetermined level, said dancer arm being pivotally positioned in a neutral position between said limit positions when said tension on said tape is at said predetermined level.

5. Apparatus according to claim 4, wherein said means for establishing said predetermined level of tension includes means for supporting said tape so that the tension on said tape pulls said arm toward one limit position, and means for biasing said arm with a predetermined negating force in an opposite direction toward said other limit position, wherein said predetermined negating force is a function of said predetermined level of tension.

6. Apparatus according to claim 4, wherein means for adjusting said second drive means responsively to changes in the position of said dancer arm includes a potentiometer coupled to said arm for producing zero output to said second drive means when said arm is in said neutral position, an output of one polarity to said second drive means so as to decrease the radial speed of said hub when said arm is moved from said neutral position toward said first limit position, and an output of an opposite polarity to said second drive means so as to increase the radial speed of said hub when said arm is moved from said neutral position toward said second limit position.

7. Apparatus according to claim 1, further including means for selecting said programmable amount of said tape and means for generating a first electrical signal as a function of said programmable amount.

8. Apparatus according to claim 7, wherein said tape measuring means includes means for generating a second electrical signal as a function of the length of tape fed by said first drive means, and said means for comparing said length of said tape with said predetermined amount includes means for comparing said first and second signals.

9. Apparatus according to claim 8, wherein said speed at which said first drive means feeds said tape is a function of said comparison between said first and second signals.

10. Apparatus according to claim 9, wherein said speed at which said first drive means feeds said tape varies nonlinearly as said length of said tape approaches said programmable amount.

11. Apparatus according to claim 1, wherein said speed at which said first drive means feeds said tape is a function of the remaining amount of tape to be wound onto said hub.

12. Apparatus according to claim 11, further including means defining a look up table for assigning a particular speed for each of a plurality of incremental amounts of remaining tape to be wound onto said hub.

13. Apparatus according to claim 12, wherein said means defining said look up table includes a binary output signal representative of the incremental amounts of remaining tape to be wound onto said hub, means for converting said binary output signal to an analog signal, means for providing a ramp signal as a function of said analog signal, and means for subtracting from said ramp signal a signal representative of the speed at which said tape is fed by said first drive means.

14. Apparatus for cutting, splicing and winding recording tape onto a hub, said apparatus comprising, in combination:

cutting means for cutting a leader tape attached to said hub;

splicing means for splicing the leading end of said recording tape to the portion of said leader tape attached to said hub;

first drive means for feeding from a supply of said tape a preselected, programmable amount of said tape at a speed which is variable in accordance with a predetermined function; said first drive means comprising tape measuring means for measuring the length of tape fed by said first drive means and means for comparing said length of said tape with said preselected amount;

second drive means for driving said hub so as to wind tape fed by said first drive means onto said hub; and tension monitoring means for maintaining substantially constant tension on said tape as said tape is fed by said first drive means and wound onto said hub by said second drive means, said tension monitoring means including (1) a pivotally mounted dancer arm for supporting the tape as said tape is fed by said first drive means and wound onto said hub by said second drive means, said dancer arm being mounted so that its pivotal position varies with the tension on said tape, and (2) means for adjusting said second drive means responsively to changes in the position of said dancer arm so as to vary the speed at which said tape is wound onto said hub in a direction and by an amount which will maintain the tape wound onto said hub at a substantially constant tension; and means responsive to said comparison between the length of tape measured by said tape measuring means and said preselected amount for disabling said first and second drive means when said length of tape measured by said tape measuring means equals said preselected amount;

wherein said cutting means is adapted to cut said recording tape when said preselected amount of tape is wound onto said hub and said splicing means is adapted to splice the trailing edge of said recording tape to the remaining portion of said leader tape.

* * * * *